United States Patent
Ogata et al.

(10) Patent No.: US 8,393,345 B2
(45) Date of Patent: Mar. 12, 2013

(54) OIL PRESSURE CONTROL DEVICE

(75) Inventors: Yusuke Ogata, Toyota (JP); Yoshinobu Soga, Toyota (JP)

(73) Assignee: Toyota Jidosha Kabushika Kaisha, Aichi-ken (JP)

( * ) Notice: Subject to any disclaimer, the term of this patent is extended or adjusted under 35 U.S.C. 154(b) by 804 days.

(21) Appl. No.: 12/529,853

(22) PCT Filed: Mar. 5, 2008

(86) PCT No.: PCT/IB2008/000509
§ 371 (c)(1), (2), (4) Date: Sep. 3, 2009

(87) PCT Pub. No.: WO2008/117143
PCT Pub. Date: Oct. 2, 2008

(65) Prior Publication Data
US 2010/0101653 A1    Apr. 29, 2010

(30) Foreign Application Priority Data
Mar. 6, 2007 (JP) ................................ 2007-055398

(51) Int. Cl.
*F16K 31/06* (2006.01)

(52) U.S. Cl. ................. 137/15.01; 137/238; 137/625.65

(58) Field of Classification Search .................. 137/238, 137/625.65, 15.01
See application file for complete search history.

(56) References Cited

U.S. PATENT DOCUMENTS

| | | | |
|---|---|---|---|
| 5,186,204 A | 2/1993 | Oka et al. | |
| 6,170,506 B1 | 1/2001 | Butwin et al. | |
| 6,453,947 B1 * | 9/2002 | Inoue et al. | 137/625.65 |
| 6,592,099 B2 * | 7/2003 | Yamamoto et al. | 137/238 |
| 7,104,283 B2 * | 9/2006 | Ino et al. | 137/625.65 |
| 2005/0087242 A1 | 4/2005 | Harms et al. | |
| 2006/0131528 A1 | 6/2006 | Long et al. | |

FOREIGN PATENT DOCUMENTS

| | | |
|---|---|---|
| EP | 1 067 316 A1 | 1/2001 |
| EP | 1 505 319 A2 | 2/2005 |
| JP | 04-171509 A | 6/1992 |
| JP | 11-082724 A | 3/1999 |
| JP | 11-270733 A | 10/1999 |
| JP | 2001-234768 A | 8/2001 |
| JP | 2004-183715 A | 7/2004 |
| JP | 2005-054970 A | 3/2005 |
| JP | 2006-046440 A | 2/2006 |

* cited by examiner

*Primary Examiner* — Kevin Lee
(74) *Attorney, Agent, or Firm* — Sughrue Mion, PLLC

(57) ABSTRACT

An oil pressure control device includes a plurality of solenoid valves, and a foreign matter discharge unit which carries out foreign matter discharge treatment for a treatment period composed of a first period T1 in which a current smaller than a predetermined value is supplied to one of the solenoid valves and a second period T2 in which a current equal to or larger than the predetermined value is supplied to the one of the solenoid valves, and makes timings for varying the current values different from one another so as to start supplying a current equal to or larger than the predetermined current value to another one of the solenoid valves at the beginning of the first period T1, and to start supplying a current smaller than the predetermined value to the another one of the solenoid valves at the beginning of the second period T2.

11 Claims, 7 Drawing Sheets

OIL PRESSURE CONTROL DEVICE

BACKGROUND OF THE INVENTION

1. Field of the Invention

The invention relates to an oil pressure control device that carries out a treatment of discharging foreign matters that have mingled in a circuit, and more particularly, to an oil pressure control device for carrying out a foreign matter discharge treatment for a plurality of solenoid valves.

2. Description of the Related Art

In each of various oil pressure control circuits, a solenoid valve such as an electromagnetic proportional control valve or the like, which operates a valve body with the aid of a solenoid in order to control the pressure of a working fluid for actuating a group of actuators, is employed. The pressure and flow rate of the working fluid that are required for actuation of the actuators are ensured by, for example, operating another control valve using an output pressure of the solenoid valve as a pilot pressure. When foreign matters mingle in an oil pressure control circuit, the valves and the like cannot operate normally. Therefore, contrivances have been made to discharge those foreign matters reliably. Foreign matter discharge control is indispensable especially in the case of a solenoid valve that has an electromagnetically driven valve body and requires accurate oil pressure control.

As this type of oil pressure control device, there is known an oil pressure control device that is equipped with solenoid valves and pressure control valves to control the pressure of a working fluid for an actuator for pulley portions (sheaves) in, for example, a belt-type continuously variable transmission for an automobile, and that is designed to control a line pressure by controlling the current supplied to the first solenoid valve for supplying a pilot pressure to the one of the pressure control valves which has the function of a regulator, and regulate/control the pressure of the working fluid for the actuator by controlling the current supplied to the second solenoid valve for supplying a pilot pressure to the one of the pressure control valves which performs the function of a pressure reduction valve using the line pressure as an original pressure. In this device, a valve plunger is moved in a reciprocating manner by varying the current command value for each of the solenoid valves. Thus, foreign matters deposited on a drain port side can be discharged, and a substantial decrease in circuit pressure on an output port side can be prevented from being caused when those foreign matters are discharged (e.g., see Japanese Patent Application Publication No. 2005-54970 (JP-A-2005-54970)).

There is also known a control device for an automatic transmission that changes over the engagement pressure of an input clutch between a first engagement pressure based on a line pressure and a second engagement pressure during neutral control which is based on a control pressure at a linear solenoid valve, and limits the engagement pressure of the input clutch at most to the first engagement pressure, which corresponds to a minimum line pressure, in performing foreign matter discharge control for the linear solenoid valve during a stop of a vehicle and before the start of neutral control, thereby reducing a shock resulting from fluctuations in the engagement pressure of the clutch during foreign matter discharge control (e.g., see Japanese Patent Application Publication No. 2004-183715 (JP-A-2004-183715)).

Moreover, there are known a valve control device for an internal combustion engine that allows foreign matters that have been stuck in an oil pressure control valve to be discharged without making variations in valve timing, by changing the current applied to an oil control valve (OCV) alternately to a maximum value and a minimum value when there is a request to clean the foreign matters during a stop of an engine with no change in the phase of a valve timing mechanism (e.g., see Japanese Patent Application Publication No. 2001-234768 (JP-A-2001-234768)), and a control apparatus for an automatic transmission that suppresses a shift shock or the vibrations of a clutch caused during the discharge of foreign matters that have entered a pressure control valve, by supplying a dither current with a large amplitude to a linear solenoid so as to remove the foreign matters when it is determined that the linear solenoid and a clutch oil pressure chamber do not communicate with each other through an oil supply passage (e.g., see Japanese Patent Application Publication No. 11-82724 (JP-A-11-82724)). In the case where stable control is constantly required during the driving of an automobile as in the case of line pressure control or the like, when an output port simultaneously communicates with a supply port and a drain port at the time of pressure regulation, a deficiency in the capacity of an oil pump or destabilization of line pressure is caused. Therefore, a so-called overlap-type linear solenoid valve with an output port that is shut off from one of a supply port and a drain port when being brought into communication with the other is used (e.g., see Japanese Patent Application Publication No. 4-171509 (JP-A-4-171509)).

However, in an oil pressure control device as mentioned above, the load applied to an object controlled by a second control valve is minimized when the pressure of a working fluid for an actuator is regulated and controlled by the second control valve using a line pressure from a first control valve as an original pressure. Nonetheless, in the case of a circuitry in which a first control valve is controlled with a pilot pressure from a first solenoid valve and a second control valve is controlled with a pilot pressure from a second solenoid valve, when a foreign matter discharge treatment for the first solenoid valve is carried out during a foreign matter discharge treatment for the second solenoid valve, a considerable load is applied to an object controlled by the second control valve. For this reason, the foreign matter discharge treatment needs to be carried out separately for the plurality of the solenoid valves. As a result, there is a problem in that the foreign matter discharge treatment is time-consuming.

Therefore, in the case where foreign matter discharge control is performed prior to, for example, neutral control of a vehicle mounted with a continuously variable transmission, a sufficient time cannot be ensured for neutral control. In consequence, there is a problem in that an effect of improving fuel consumption through neutral control is lost as well.

SUMMARY OF THE INVENTION

The invention to provide an oil pressure control device capable of carrying out a foreign matter discharge treatment simultaneously for a plurality of solenoid valves in an oil pressure control circuit that is equipped with the plurality of the solenoid valves and means for carrying out the foreign matter discharge treatment for the solenoid valves so as to perform accurate oil pressure control.

A first aspect of the invention relates to (1) an oil pressure control device equipped with a plurality of solenoid valves having pressure regulating valves for regulating oil pressures of a working fluid supplied thereto in accordance with displacement strokes of valve bodies respectively and outputting the regulated oil pressures respectively and electromagnetic drive portions for displacing the valve bodies of the pressure regulating valves with forces corresponding to supplied currents respectively, and foreign matter discharge means for carrying out a foreign matter discharge treatment for the plurality of the solenoid valves by varying current values of the currents flowing through the plurality of the solenoid valves respectively in an increasing direction or a decreasing direction and displacing the valve bodies of the respective solenoid valves in a reciprocating manner. In this oil pressure control device, the foreign matter discharge means carries out the foreign matter discharge treatment for a treatment period composed of a first period in which a current smaller than a predetermined current value is supplied to one of the plurality of the solenoid valves and a second period in which a current equal to or larger than the predetermined current value is supplied to the one of the plurality of the solenoid valves. The foreign matter discharge means makes timings for varying the current values of the plurality of the solenoid valves different from one another in such a manner as to start supplying a current equal to or larger than the predetermined current value to another one of the plurality of the solenoid valves at the beginning of or during the first period and start supplying a current smaller than the predetermined current value to the another one of the plurality of the solenoid valves at the beginning of or during the second period.

Owing to this configuration, in the case where the influence of the operation of one of the plurality of the solenoid valves causes changes in the flow rate or pressure controlled by another one of the solenoid valves and outputs of the plurality of the solenoid valves influence the controlled oil pressure of the oil pressure control device in the same direction (a certain direction), when, for example, the output pressures of the respective solenoid valves increase in a foreign matter discharge period, the controlled pressure of the entire device tends to increase as well. In other words, when the output pressure of the one of the solenoid valves increases, the output of the regulated pressure of the another one of the solenoid valves decreases, whereas when the output pressure of the one of the solenoid valves decreases, the output of the regulated pressure of the another one of the solenoid valves increases. Accordingly, the foreign matter discharge treatment can be carried out simultaneously for the plurality of the solenoid valves without greatly influencing the controlled oil pressure of the oil pressure control device. It should be noted herein that making the timings for varying the current values different from one another means making timings at which the current values of the plurality of the solenoid valves increase different from one another or making timings at which the current values of the plurality of the solenoid valves decrease different from one another.

A second aspect of the invention relates to (2) an oil pressure control device that is equipped with a first solenoid valve and a second solenoid valve, which have pressure regulating valves for regulating pressures of a working fluid supplied thereto in accordance with displacement strokes of valve bodies and outputting the regulated pressures respectively and electromagnetic drive portions for displacing the valve bodies of the pressure regulating valves with forces corresponding to supplied currents respectively, a first control valve that is actuated using a working fluid pressure output from the first solenoid valve as a pilot pressure to regulate a pressure of the supplied working fluid in accordance with a supply pressure of the working fluid and the pilot pressure from the first solenoid valve, a second control valve that has input thereto the working fluid pressure regulated by the first control valve as an original pressure and is actuated using a working fluid pressure output from the second solenoid valve as a pilot pressure to regulate the pressure of the working fluid at the original pressure in accordance with the pilot pressure from the second solenoid valve and output the regulated pressure, and foreign matter discharge means for carrying out a foreign matter discharge treatment for the first solenoid valve and the second solenoid valve by varying current values of currents flowing through the first solenoid valve and the second solenoid valve respectively in an increasing direction or a decreasing direction and displacing the valve bodies of the respective solenoid valves in a reciprocating manner. The foreign matter discharge means carries out the foreign matter discharge treatment for a treatment period composed of a first period in which a current smaller than a predetermined current value is supplied to one of the first solenoid valve and the second solenoid valve and a second period in which a current equal to or larger than the predetermined current value is supplied to the one of the solenoid valves. The foreign matter discharge means makes timings for varying the current values of the first solenoid valve and the second solenoid valve different from each other in such a manner as to start supplying a current equal to or larger than the predetermined current value to the other of the first solenoid valve and the second solenoid valve at the beginning of or during the first period, and start supplying a current smaller than the predetermined current value to the other of the solenoid valves at the beginning of or during the second period.

Owing to this configuration, in the foreign matter discharge period, the timings for varying the current values of the first solenoid valve and the second solenoid valve are different from each other. Therefore, when the output pressure of the second control valve at the time of pressure regulation which is based on the pilot pressure from the second solenoid valve increases, the original pressure of the second control valve as the output pressure of the first control valve which is based on the pilot pressure from the first solenoid valve decreases, whereas when the output pressure of the second control valve at the time of pressure regulation which is based on the pilot pressure from the second solenoid valve decreases, the original pressure of the second control valve as the output pressure of the first control valve which is based on the pilot pressure from the first solenoid valve increases. Accordingly, even when the first solenoid valve and the second solenoid valve are simultaneously subjected to the foreign matter discharge treatment, the occurrence of a situation in which an actuator or the like as a controlled object is adversely influenced due to a high output pressure of the second control valve is avoided. As a result, the foreign matter discharge treatment can be carried out simultaneously for the two solenoid valves without greatly influencing the controlled oil pressure of the oil pressure control device, and a swift transition to subsequent oil pressure control can be made.

In the oil pressure control device according to the second aspect of the invention, (3) the first solenoid valve and the second solenoid valve may each be designed as a normally open-type solenoid valve for maximizing the output oil pressure when a minimum current value is obtained within a variation range of the current value. The foreign matter discharge means may change the current supplied to one of the first solenoid valve and the second solenoid valve from the minimum current value to a maximum current value within the variation range of the current value in starting to supply the current smaller than the predetermined current value to the one of the solenoid valves, set, when the current supplied to one of the first solenoid valve and the second solenoid valve assumes the maximum current value, the current supplied to the other of the first solenoid valve and the second solenoid valve to the minimum current value, set the current supplied to the one of the solenoid valves to an intermediate current value smaller than the maximum current value and larger than the minimum current value when the current supplied to the other of the solenoid valves assumes the maximum current value, and set the current supplied to the one of the solenoid valves to the minimum current value when the current supplied to the other of the solenoid valves assumes the intermediate current value.

Owing to this configuration, the supplied current is temporarily set to the intermediate current value in starting to make a change from the maximum current value to the minimum current value. Thus, the value of the supplied current upon completion of the change to the minimum current value is restrained from undershooting, and a more swift transition to subsequent oil pressure control can be made.

(4) The first solenoid valve and the second solenoid valve may be designed as linear solenoid valves for translating the valve bodies, which assume a spool-like shape, in accordance with thrust forces from the electromagnetic drive portions respectively.

Owing to this configuration, the foreign matter discharge treatment can be carried out simultaneously for the two solenoid valves without greatly influencing the controlled oil pressure of the oil pressure control device. As a result, the spools of the linear solenoid valves are prevented from having the foreign matters stuck therein, and from deteriorating in sliding performance or seizing due to sludge produced around lands of the spools.

In the oil pressure control device according to each of the foregoing aspects of the invention, (5) the second control valve may further have an output port for the working fluid at the regulated pressure, and the output port may be connected to an oil pressure introduction port of an actuator constituting part of a vehicular continuously variable transmission.

Owing to this configuration, the foreign matter discharge treatment can be carried out quickly without adversely influencing the actuator constituting part of the vehicular continuously variable transmission.

The third aspect of this invention relates to a control method in an oil pressure control device. This control method in the oil pressure control device includes a step of making determinations on states of the first solenoid valve and the second solenoid valve, a step of determining whether or not a predetermined foreign matter discharge condition is fulfilled and a step of starting to supply, at a beginning of or during a first period in which a current smaller than a predetermined current value is supplied to one of the first solenoid valve and the second solenoid valve, a current equal to or larger than the predetermined current value to the other of the first solenoid valve and the second solenoid valve, and starting to supply a current smaller than the predetermined current value to the other of the solenoid valves at a beginning of or during a second period in which a current equal to or larger than the predetermined current value is supplied to the one of the solenoid valves, when the foreign matter discharge condition is fulfilled.

According to the invention, the oil pressure control device capable of carrying out the foreign matter discharge treatment simultaneously for the plurality of the solenoid valves without greatly influencing the controlled oil pressure of oil pressure control and carrying out the foreign matter discharge treatment quickly in the oil pressure control circuit that is equipped with the plurality of the solenoid valves and the means for carrying out the foreign matter discharge treatment for the solenoid valves so as to perform the oil pressure control accurately can be provided.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

The embodiments of the invention will be described hereinafter on the basis of the drawings.

First Embodiment

FIGS. 1 to 6 are views showing the first embodiment of an oil pressure control device according to the invention. These figures show an example in which the invention is applied to an oil pressure control device for controlling the pressure of a working fluid in a belt-type continuously variable transmission for an automobile.

Figure 1:
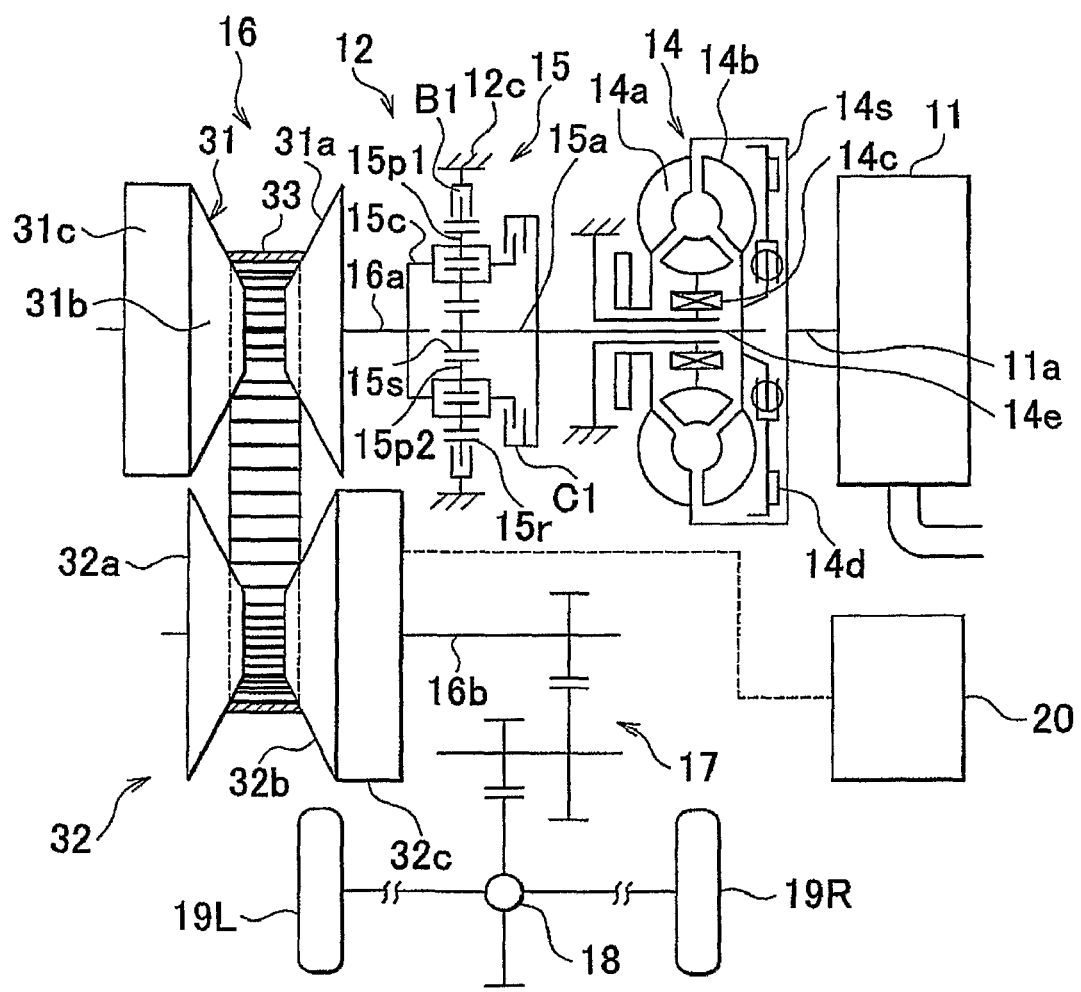
FIG. 1 is a schematic configurational view showing a first embodiment of an oil pressure control device according to the invention.

First of all, the configuration of the oil pressure control device will be described. As shown in FIG. 1 as a skeleton diagram of a power transmission path of the automobile, a vehicle (the automobile not entirely shown) according to this embodiment of the invention is mounted with an engine 11 as a prime mover, and a transmission 12 capable of changing the speed of the rotational output of this engine 11. The transmission 12 includes a torque converter 14, a forward/backward changeover gear mechanism 15, a belt-type continuously variable shift mechanism 16, and an oil pressure control portion 20. A power transmission path is set such that an output shaft 16b of the continuously variable shift mechanism 16 transmits power to wheels 19R and 19L (running output portions) sides via a reduction gear mechanism 17 and a differential gear unit 18.

The engine 11 is, for example, a multi-cylinder internal combustion engine transversely mounted on the vehicle. Although not shown in detail, as is the case with known engines, a combustion chamber defined by a piston is formed in each cylinder of the engine 11 and fitted with an intake valve and an exhaust valve that open/close at predetermined timings, and an ignition plug is disposed so as to be exposed to the inside of the combustion chamber. A throttle valve is provided on an upstream side of an intake passage formed by an intake manifold, and an injector (fuel injection device) for injecting fuel is provided in a space from this intake passage to the combustion chamber of each cylinder. Although, for example, gasoline is used as fuel, ethanol or gaseous fuel may be used as fuel. In this embodiment of the invention, the engine 11 and the transmission 12 constitute a power unit for front drive.

The torque converter 14 is constructed with a pump impeller 14a coupled to an output shaft 11a of the engine 11 via a drive plate (not shown) and a shell cover 14s, a turbine runner 14b opposed to this pump impeller 14a and coupled to an input shaft 15a of the forward/backward changeover gear mechanism 15, a stator 14c located between the pump impeller 14a and the turbine runner 14b, and a working fluid (not shown) accommodated in the shell cover 14s. When the working fluid flows due to rotation of the pump impeller 14a on an input side, which is driven by the output shaft 11a of the engine 11, the turbine runner 14b receives an inertial force of the flow and thus rotates the input shaft 15a of the forward/backward changeover gear mechanism 15 via a turbine shaft 14e. A stator 14c rectifies the flow of the working fluid returning from the turbine runner 14b to the pump impeller 14a, and hence, a torque amplification effect is produced as a result of a counterforce of the stator 14c.

The torque converter 14 is provided with a lockup clutch 14d capable of selectively tying down the pump impeller 14a and the shell cover 14s on the input side and the turbine runner 14b on an output side. In combination with mechanical clutches, the torque converter 14 can enhance the efficiency of torque transmission.

The forward/backward changeover gear mechanism 15 is constructed of a double pinion-type planetary gear mechanism, and is equipped with a sun gear 15s integrally coupled to the input shaft 15a, an internal ring gear 15r supported by a transmission case 12c via a brake B1 for running backward, pinions 15p1 and 15p2 located between the sun gear 15s and the ring gear 15r and meshed with one and the other of the sun gear 15s and the ring gear 15r respectively, a carrier 15c supporting the pinions 15p1 and 15p2 such that the pinions 15p1 and 15p2 can rotate around their own axes and around the carrier 15c and integrally coupled to an input shaft 16a of the continuously variable shift mechanism 16, a clutch C1 for running forward that selectively couples the carrier 15c and the turbine shaft 14e to each other, and the brake B1 for running backward, which can make a changeover between a brake engagement state in which the internal ring gear 15r is selectively fixed and coupled to the transmission case 12c and a brake release state in which the ring gear 15r is rotatably supported by the transmission case 12c.

By engaging the clutch C1 for running forward and releasing the brake B1 for running backward, this forward/backward changeover gear mechanism 15 can transmit rotational power in a forward running direction to directly couple the turbine shaft 14e and the input shaft 16a of the continuously variable shift mechanism 16 to each other. On the other hand, by releasing the clutch C1 for running forward and engaging the brake B1 for running backward, the forward/backward changeover gear mechanism 15 can cause the carrier 15c to slowly rotate around the sun gear 15s in a direction opposite to the rotational direction thereof and thus transmit rotational power in a backward running direction to input reduced rotation to the input shaft 16a of the continuously variable shift mechanism 16 in the opposite direction.

The continuously variable shift mechanism 16 includes a primary pulley 31 as an input-side variable sheave coupled to the input shaft 16a, a secondary pulley 32 as an output-side variable sheave coupled to the output shaft 16b, and a belt 33 for power transmission that is wound between both the pulleys 31 and 32.

The primary pulley 31 has a fixed rotary member 31a fixed to the input shaft 16a, a movable rotary member 31b axially displaceably supported by the input shaft 16a such that a generally V-shaped groove is formed between the movable rotary member 31b and the fixed rotary member 31a, and a known hydraulic actuator 31c for applying an oil pressure to a back face side of the movable rotary member 31b to axially displace the movable rotary member 31b and thereby change the effective diameter of the primary pulley 31. The secondary pulley 32 also has a fixed rotary member 32a fixed to the output shaft 16b, a movable rotary member 32b axially displaceably supported by the output shaft 16b such that a generally V-shaped groove is formed between the movable rotary member 32b and the fixed rotary member 32a, and a known hydraulic actuator 32c for applying an oil pressure to a back face side of the movable rotary member 32b to axially displace the movable rotary member 32b and thereby change the effective diameter of the secondary pulley 32.

The hydraulic actuator 31c of the primary pulley 31 and the hydraulic actuator 32c of the secondary pulley 32 are each controlled by the oil pressure control portion 20. A change gear ratio, namely, a ratio of the effective diameter of the secondary pulley 32 to the effective diameter of the primary pulley 31 (change gear ratio=effective radius ro of output-side variable sheave/effective radius ri of input-side variable sheave) is continuously and variably controlled to achieve continuously variable shift. The working fluid pressures in the hydraulic actuators 31c and 32c of both the pulleys 31 and 32 are each controlled by the oil pressure control portion 20 such that the primary pulley 31 and the secondary pulley 32 can apply an appropriate clamping force to the belt 33 without causing slippage thereof. As described above, the oil pressure control portion 20 has a function of controlling the change gear ratio and the clamping force of the belt in the continuously variable shift mechanism 16.

Although not shown in detail, the oil pressure control portion 20 also has a function of performing forward/backward changeover control by operating the clutch C1 for running forward and the brake B1 for running backward in the forward/backward changeover gear mechanism 15.

Figure 2:
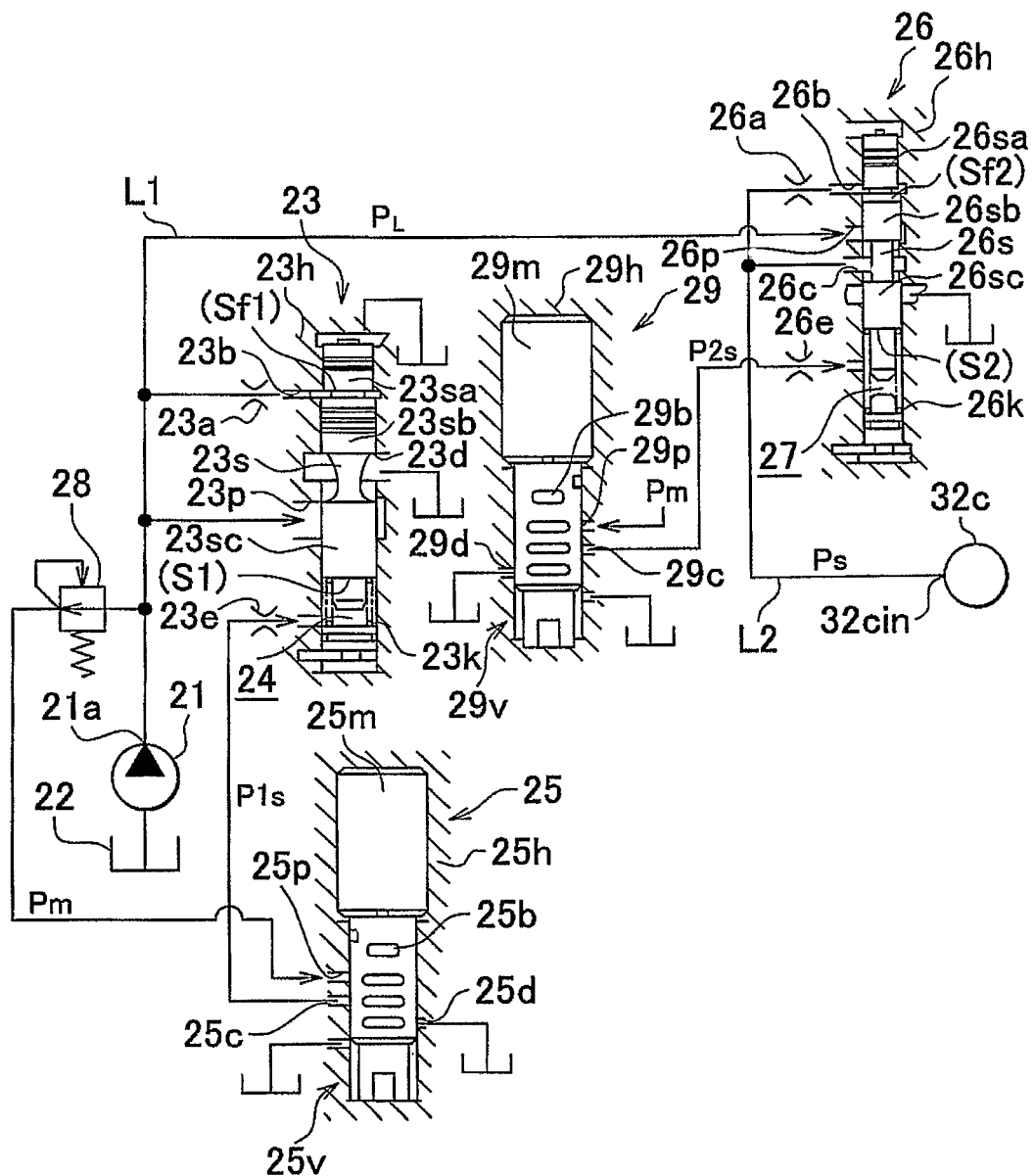
FIG. 2 is an oil pressure control circuit diagram of an essential part of the oil pressure control device according to the first embodiment of the invention.

More specifically, the oil pressure control portion 20 controls the change gear ratio and the clamping force of the belt in the continuously variable shift mechanism 16 by means of the oil pressure control circuit shown in FIG. 2. In the following description, it is assumed that the oil pressure control portion 20 controls the pressure of the working fluid in the hydraulic actuator 32c of the secondary pulley 32.

Referring to FIG. 2, the oil pump 21 is actuated through, for example, rotation of the input shaft of the transmission 12 to pump up the working fluid from a tank 22 in the transmission 12 and pressurize and discharge the working fluid.

The working fluid pressurized by the oil pump 21 is supplied to a supply pressure port 23p of a first control valve 23 having functions of relief and pressure control, and is further supplied to a feedback pressure port 23b via an orifice portion 23a. The supply pressure port 23p of the first control valve 23 communicates with a line oil pressure passage L1 communicating with a discharge port 21a of the oil pump 21. The first control valve 23 can control a line oil pressure PL.

This first control valve 23 has a valve housing 23h constituting part of an oil pressure controller in the transmission 12, a spool 23s slidably held in the valve housing 23h, and a helical compression spring 23k accommodated in a predetermined compressed state between the valve housing 23h and the spool 23s so as to urge the spool 23s upward in FIG. 2.

It should be noted herein that, in accordance with a pressure receiving area difference Sf1 between a first land portion 23sa and a second land portion 23sb that are different in diameter from each other and a feedback pressure PL' supplied to the feedback pressure port 23b, the spool 23s receives a thrust force acting downward in FIG. 2 (line oil pressure PL×pressure receiving area difference Sf1). In addition to the orifice portion 23a, the feedback pressure port 23b, and the supply pressure port 23p, an orifice portion 23e and an operation pressure chamber 24 in which the helical compression spring 23k is accommodated are formed in the valve housing 23h. An output pressure P1s from a first linear solenoid valve 25 is introduced into this operation pressure chamber 24 through the orifice portion 23e. The spool 23s then receives an urging force Fs1 from the helical compression spring 23k that acts upward in FIG. 2 and a hydraulic force in the operation pressure chamber 24 that acts on a pressure receiving area 51 corresponding to a cross-sectional area of a third land portion 23sc of the spool 23s, as an upward thrust force (output pressure P1s×pressure receiving area S1+urging force Fs1).

Accordingly, when located above a neutral position shown in FIG. 2 due to, for example, a low value of the line oil pressure PL supplied to the feedback pressure port 23b, the spool 23s shuts off the supply pressure port 23p and a drain port 23d, which are formed in the valve housing 23h, from each other. When displaced downward in FIG. 2 from the neutral position while compressing the helical compression spring 23k due to a high value of the line oil pressure PL, the spool 23s can establish communication between the supply pressure port 23p and the drain port 23d with an opening degree corresponding to an amount of the displacement. By the first control valve 23 constructed as described above, the line oil pressure PL is regulated as a value obtained by dividing the thrust force acting upward in FIG. 2, which is received by the spool 23s, by the pressure receiving area difference Sf1 between the first land portion 23sa and the second land portion 23sb ((P1s×S1+Fs1)/Sf1). By changing the output pressure P1s from the first linear solenoid valve 25, the line oil pressure PL can be controlled.

Figure 3:
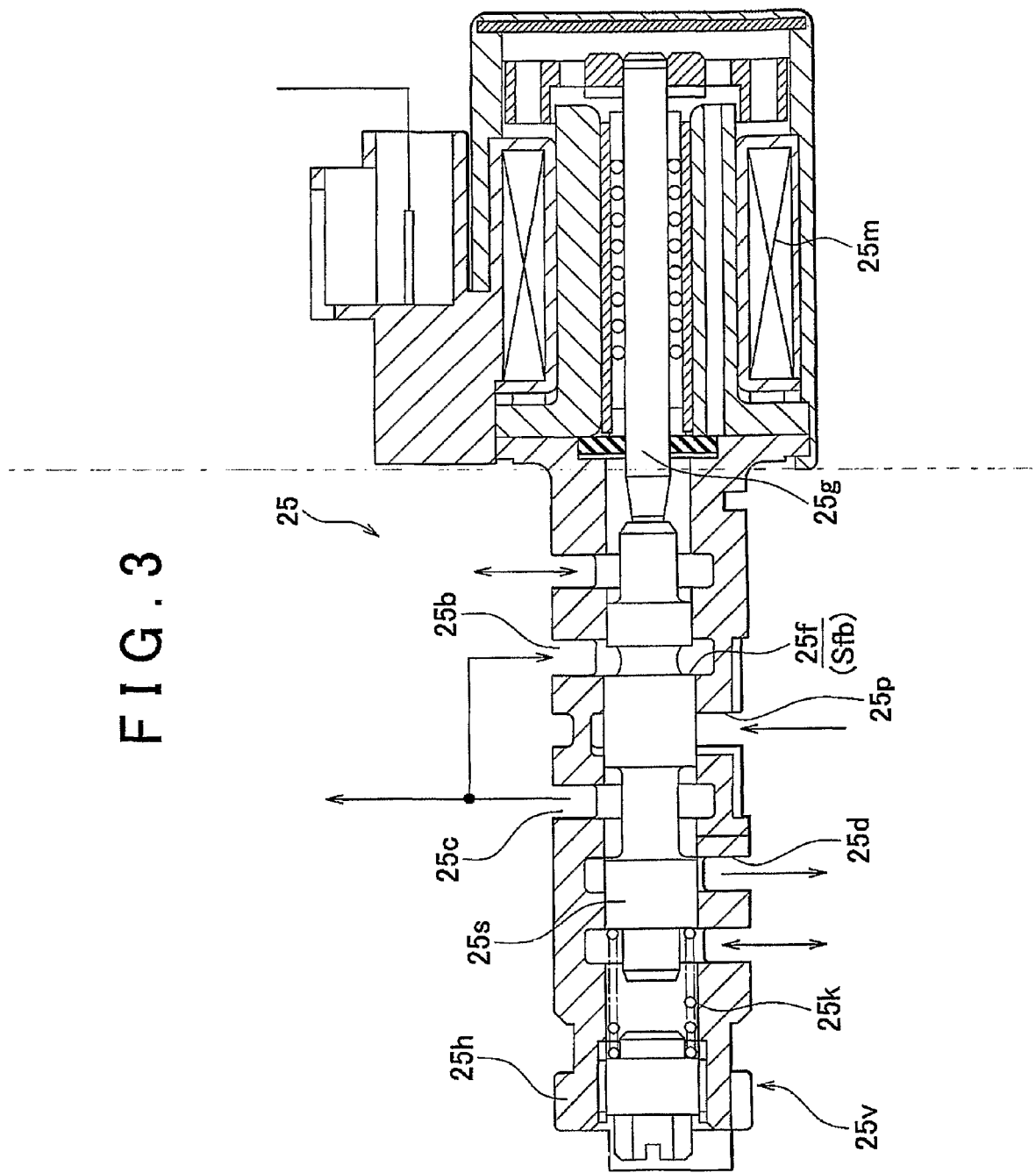
FIG. 3 is a schematic cross-sectional view of each linear solenoid valve in the first embodiment of the invention.

The first linear solenoid valve 25 is designed as an overlap type solenoid valve shown in FIG. 3. That is, the first linear solenoid valve 25 is an electromagnetic proportional valve equipped with a sleeve-like valve housing 25h in which a supply pressure port 25p, a feedback port 25b, a drain port 25d, and an output port 25c are formed, a spool 25s slidably held in the valve housing 25h, a helical compression spring 25k for urging the spool 25s toward one side in an axial direction, and a driving solenoid portion 25m for generating a suction force for displacing the spool 25s toward the other side in the axial direction against an urging force of the helical compression spring 25k in accordance with a supplied current. In this first linear solenoid valve 25, the spool 25s receives a thrust force acting toward the other side in the axial direction, which corresponds to the current supplied to the driving solenoid portion 25m, from a plunger 25g of the driving solenoid portion 25m, and receives a thrust force acting toward the other side in the axial direction in a feedback pressure chamber 25f as well, thereby being displaced while compressing the helical compression spring 25k in accordance with both the thrust forces. That is, the spool 25s is designed such that the land portions on both the sides of the feedback pressure chamber 25f are different in diameter from each other, to ensure that the pressure receiving face on the left side (on the other side in the axial direction) in FIG. 3 is larger in area than the pressure receiving face on the right side by a pressure receiving area difference Sfb in the feedback pressure chamber 25f into which the output pressure P1s from the output port 25c is introduced through the feedback port 25b. The spool 25s is urged toward the other side in the axial direction with an urging force corresponding to the pressure (output pressure) in the feedback pressure chamber 25f (output pressure P1s×pressure receiving area difference Sfb). In this case, there is established a relationship: Wsp=P1s×Sfb+W(I) given that Wsp denotes an urging force resulting from a spring load of the helical compression spring 25k and that W(I) denotes a thrust force from the plunger 25g of the driving solenoid portion 25m which corresponds to a supplied current I. Thus, as regards the output pressure P1s, there is established a relationship: P1s=(Wsp−W(I))/Sfb.

In this first linear solenoid valve 25 of the overlap type, the spool 25s fully opens the supply pressure port 25p and shuts off the output port 25c from the drain port 25d when the output pressure P1s entering the feedback pressure chamber 25f from the output port 25c is low, and on the other hand, brings the output port 25c into communication with the drain port 25d when the output pressure P1s entering the feedback pressure chamber 25f from the output port 25c is high. That is, the first linear solenoid valve 25 is designed as a normally open-type solenoid valve whose output pressure is maximized when the current supplied thereto assumes a minimum value (e.g., zero (A)) and whose output pressure is minimized when the current supplied thereto assumes a maximum value (e.g., 1 (A)). The invention is also applicable in the case where a three-way electromagnetic valve having a supply pressure port, a drain port, and an output port but no feedback port is employed instead of the first linear solenoid valve 25.

As shown in FIG. 2, an oil pressure Pm supplied to the supply pressure port 25p of the first linear solenoid valve 25 is supplied from the line oil pressure passage L1 via a modulator valve 28 at a predetermined modulator pressure Pm. The valve housing 25h and the spool 25s constitute a pressure regulating valve 25v in the invention.

The line pressure PL, which is controlled by the first control valve 23 in accordance with the output pressure of the first linear solenoid valve 25, is supplied to an input port 26p of a second control valve 26 having a pressure regulating function through the line oil pressure passage L1 as an original pressure. This second control valve 26 has a valve housing 26h constituting part of the oil pressure controller in the transmission 12, a spool 26s slidably held in the valve housing 26h, and a helical compression spring 26k accommodated in a predetermined compression state between the valve housing 26h and the spool 26s so as to urge the spool 26s upward in FIG. 2.

In accordance with a pressure receiving area difference Sf2 between a first land portion 26sa and a second land portion 26sb that are different in diameter from each other and a feedback pressure Pf, the spool 26s receives a thrust force acting downward in FIG. 2 (feedback oil pressure Pf×pressure receiving area difference Sf2). The feedback oil pressure Pf in this case is an oil pressure in a working fluid pressure supply line L2 leading to an oil pressure introduction port 32c in of the hydraulic actuator 32c, and the oil pressure in the supply line L2 is supplied to a feedback pressure port 26b through an orifice portion 26a. This working fluid pressure supply line L2 also communicates with an output port 26c of the second control valve 26. The second control valve 26 can control the pressure of the working fluid in the hydraulic actuator 32c of the secondary pulley 32.

In addition to the orifice portion 26a, the feedback pressure port 26b, the output port 26c, and the supply pressure port 26p, an orifice portion 26e and an operation pressure chamber 27 in which the helical compression spring 26k is accommodated are formed in the valve housing 26h. An output pressure P2s from a second linear solenoid valve 29 is introduced into this operation pressure chamber 27 through the orifice portion 26e. The spool 26s then receives an urging force Fs2 from the helical compression spring 26k that acts upward in FIG. 2 and a hydraulic force in the operation pressure chamber 27 that acts on a pressure receiving area S2 corresponding to a cross-sectional area of a third land portion 26sc of the spool 26s, as an upward thrust force (output pressure P2s×pressure receiving area S2+urging force Fs2).

Accordingly, when located above a neutral position shown in FIG. 2 due to, for example, a low value of the working fluid pressure Ps of the hydraulic actuator 32c of the secondary pulley 32 that is supplied to the feedback pressure port 26b, the spool 26s brings the output port 26c and the supply pressure port 26p, which are formed in the valve housing 26h, into communication with each other with an opening degree corresponding to an amount of the displacement. When displaced downward in FIG. 2 from the neutral position while compressing the helical compression spring 26k due to, for example, a high value of the working fluid pressure Ps in the oil pressure actuator 32c of the secondary pulley 32 that is supplied to the feedback pressure port 26b, the spool 26s shuts off the output port 26c and the supply pressure port 26p from each other.

By the second control valve 26 constructed as described above, the working fluid pressure Ps in the hydraulic actuator 32c of the secondary pulley 32 is regulated as a value obtained by dividing the thrust force acting upward in FIG. 2, which is received by the spool 26s, by the pressure receiving area difference Sf2 between the first land portion 26sa and the second land portion 26sb ((P2s×S2+Fs2)/Sf2). By changing the output pressure P2s from the second linear solenoid valve 29, the working fluid pressure Ps in the hydraulic actuator 32c can be controlled.

The second linear solenoid valve 29 is designed as an overlap type solenoid valve identical or similar to the first linear solenoid valve 25 shown in FIG. 3. The second linear solenoid valve 29 is designed as an electromagnetic proportional valve equipped with a sleeve-like valve housing 29h in which a supply pressure port 29p, a feedback port 29b, a drain port 29d, and an output port 29c are formed, a spool (not shown) and a helical compression spring (not shown), which are slidably held in the valve housing 29h (which are identical or similar to the spool 25s and the helical compression spring 25k of the first linear solenoid valve 25 respectively, the spool (not shown) having the pressure receiving area difference Sib as is the case with the spool 25s), and a driving solenoid portion 29m for generating a thrust force for displacing the spool toward the other side in an axial direction against an urging force of the helical compression spring.

In this second linear solenoid valve 29, the spool receives a thrust force acting toward the other side in the axial direction, which corresponds to the current supplied to the driving solenoid portion 29m, and receives a thrust force acting toward the other side in the axial direction in a feedback pressure chamber leading to the feedback port 29b as well, thereby being displaced while compressing the helical compression spring in accordance with both the thrust forces. The spool fully opens the supply pressure port 29p and shuts off the output port 29c from the drain port 29d when the output pressure P2s entering the feedback port 29b from the output port 29c is low, and on the other hand, brings the output port 29c into communication with the drain port 29d when the output pressure P2s entering the feedback port 29b from the output port 29c is high. That is, the second linear solenoid valve 29 is designed as a normally open-type solenoid valve whose output pressure is maximized when the current supplied thereto assumes a minimum value (e.g., zero (A)) and whose output pressure is minimized when the current supplied thereto assumes a maximum value (e.g., 1 (A)). The valve housing 29h and the spool accommodated therein may function as a pressure regulating valve 29v. In this second linear solenoid valve 29 as well, there is established a relationship: output pressure P2s=(Wsp−W(I))/Sfb given that Wsp denotes an urging force resulting from a spring load of the helical compression spring and that W(I) denotes a thrust force from the plunger of the driving solenoid portion 29m which corresponds to the supplied current I.

Figure 4:
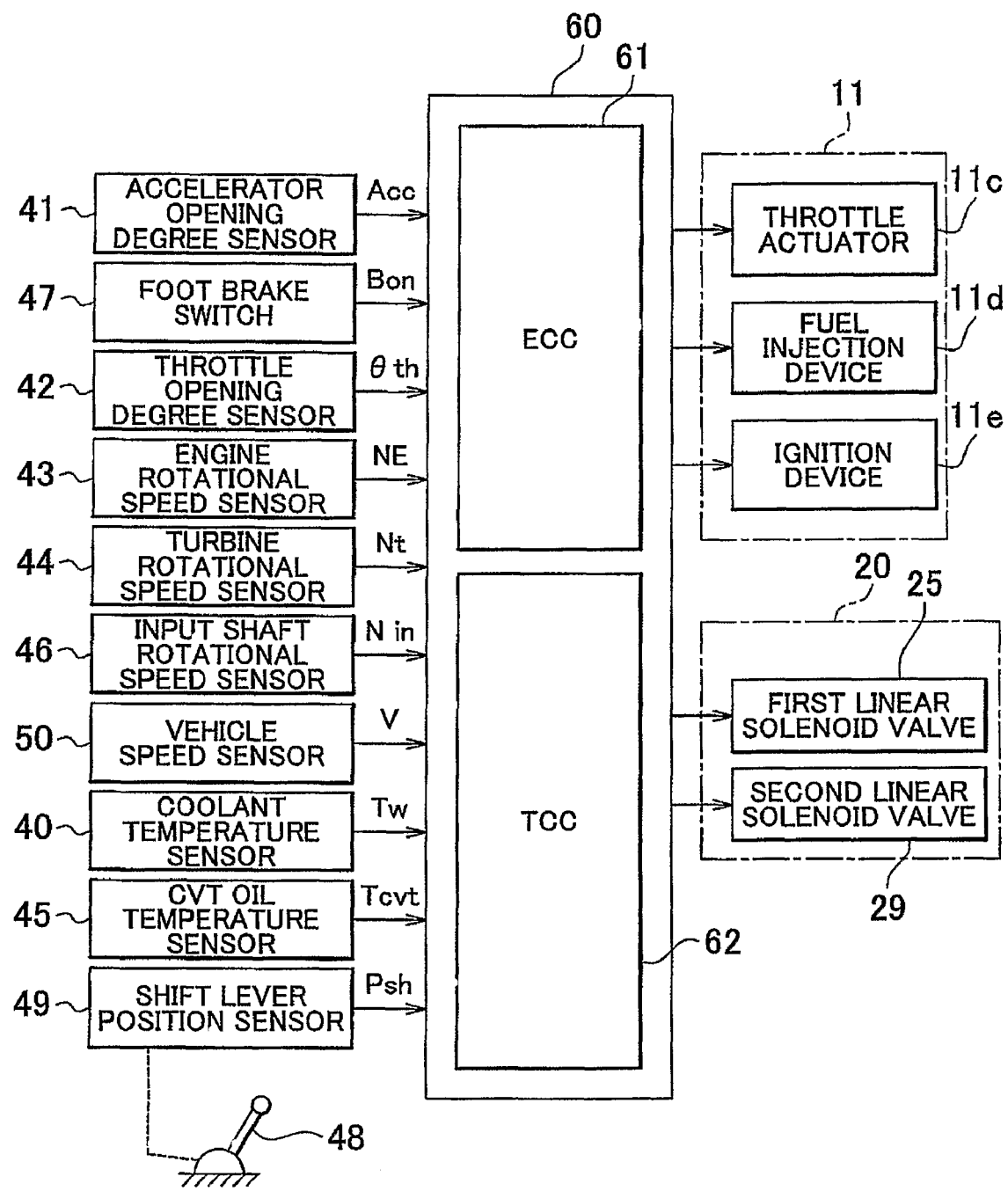
FIG. 4 is a block diagram of a control system in the first embodiment of the invention.

As shown in FIG. 4, the first linear solenoid valve 25 and the second linear solenoid valve 29 are controlled by a control unit 60 configured by integrating an engine control computer (ECC in FIG. 4) 61 with a transmission control computer (TCC in FIG. 4) 62.

This control unit 60 is configured with a CPU, a ROM, a RAM, a B-RAM (backup RAM), an A/D converter, a communication IC, a constant-voltage power supply circuit, and the like. The control unit 60 controls a throttle actuator 11c, a fuel injection device 11d, an ignition device 11e, and the like in the engine 11 on the basis of pieces of sensor information from a group of various sensors, which will be described later, and performs electronic control of the engine 11 and the transmission 12 while acquiring signals and the like from a control computer of another system (not shown) as well.

The control unit 60 controls the output pressures of the linear solenoid valves 25 and 29 through the control of the currents supplied to the linear solenoid valves 25 and 29 in the oil pressure control portion 20 such that an optimal value of the line oil pressure PL corresponding to a torque generated by the engine or the like and a controlled pressure most suited for a shift in the continuously variable shift mechanism 16 are obtained, in accordance with an operation position Psh of a shift lever 48 provided in a cabin, a vehicle speed V, a throttle opening degree θth, and the like.

Furthermore, the control unit 60 according to this embodiment of the invention varies the current values of the currents flowing through the linear solenoid valves 25 and 29 in an increasing direction or a decreasing direction on a predetermined variation condition, thereby axially displacing the spools 25s and the like of the respective linear solenoid valves 25 and 29 in a reciprocating manner. In other words, the control unit 60 is endowed with the function of foreign matter discharge means for carrying out a foreign matter discharge treatment for the linear solenoid valves 25 and 29 when a foreign matter discharge condition set in advance is fulfilled.

It should be noted herein that the linear solenoid valves 25 and 29 are designed as electromagnetic proportional-type solenoid valves equipped with the pressure regulating valves 25v and 29v for regulating the oil pressures and flow rates of the working fluid supplied to the input ports 25p and 29p in accordance with displacement strokes of the spools respectively and outputting the regulated oil pressures and flow rates from the output ports 25c and 29c respectively, and the driving solenoid portions 25m and 29m (electromagnetic drive portions) for displacing the valve bodies of the pressure regulating valves 25v and 29v with forces corresponding to the supplied currents respectively. Therefore, the foreign matter discharge treatment can be carried out by varying the currents supplied to the electromagnetic drive portions 25m and 29m.

Figure 5:
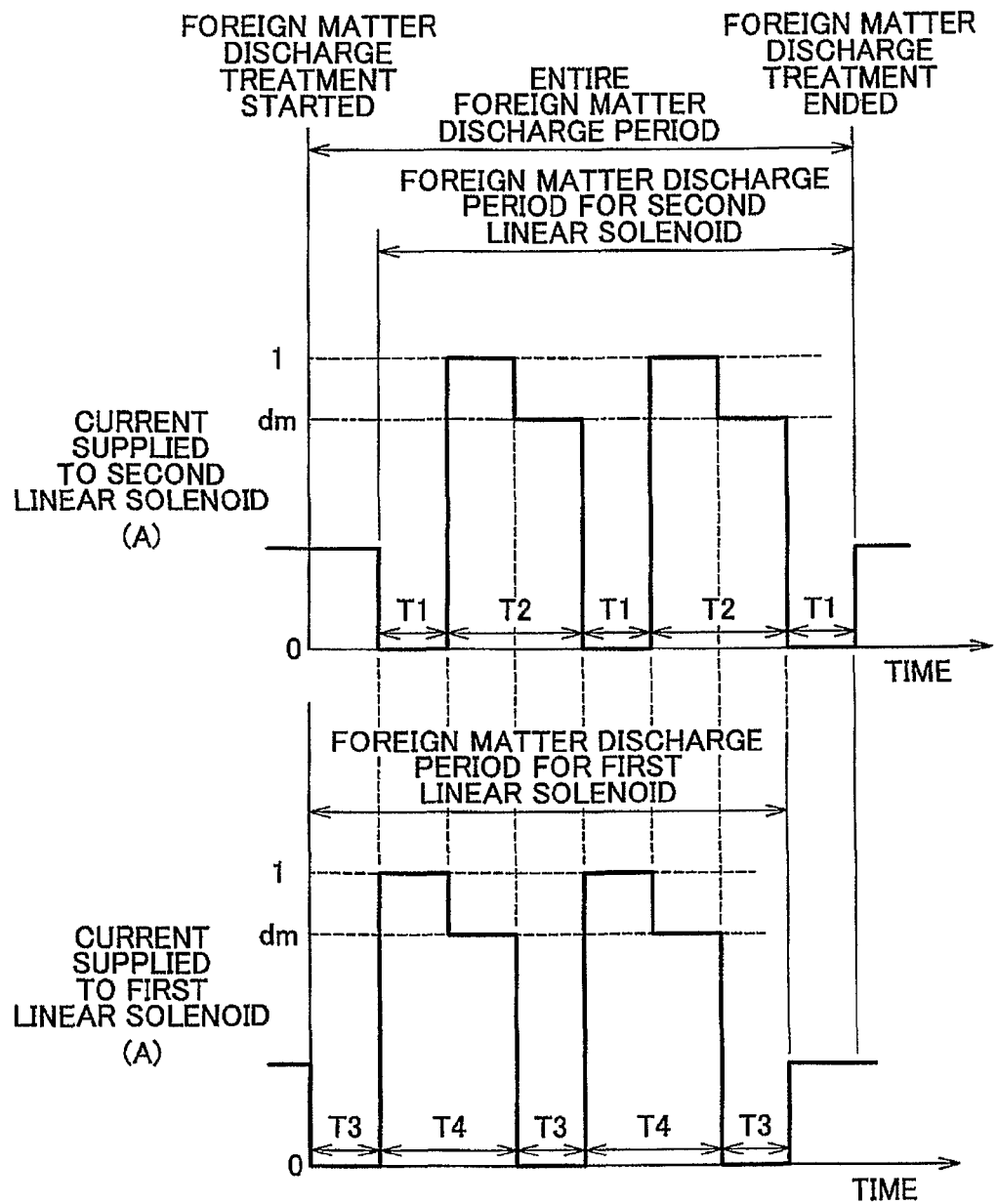
FIG. 5 is an illustrative view of changes in supplied currents in carrying out a foreign matter discharge treatment simultaneously for a plurality of linear solenoid valves in the first embodiment of the invention.

As shown in FIG. 5, a treatment period for which the control unit 60 as the foreign matter discharge means carries out the foreign matter discharge treatment is set by alternately arranging a first period T1 in which a current smaller than a predetermined current value is supplied to one of the linear solenoid valves 25 and 29, for example, the second linear solenoid valve 29 and a second period T2 in which a current equal to or larger than the predetermined current value is supplied to the second linear solenoid valve 29. The timings for varying the current values of the linear solenoid valves 25 and 29 are made different from each other by starting to supply a current equal to or larger than the predetermined current value to the other of the linear solenoid valves 25 and 29, for example, the first linear solenoid valve 25 at the beginning of or during the first period T1 and starting to supply a current smaller than the predetermined current value to the first linear solenoid valve 25 at the beginning of or during the second period T2. The predetermined current value mentioned herein is, for example, a current value corresponding to a control target oil pressure immediately after or before the period for the foreign matter discharge treatment. In FIG. 5, the difference between the timings for varying the current values of both the linear solenoid valves 25 and 29 is set as a time difference equal to about half of the second period T2. Further, a third period T3 in which a current smaller than the predetermined current value is supplied to the first linear solenoid valve 25 is as long as the first period T1, and a fourth period T4 in which a current equal to or larger than the predetermined current value is supplied to the first linear solenoid valve 25 is as long as the second period T2.

In starting to supply the current equal to or larger than the predetermined current value to one of the first linear solenoid valve 25 and the second linear solenoid valve 29, for example, the first linear solenoid valve 25, the control unit 60 as the foreign matter discharge means changes the current supplied to the linear solenoid valve 25 from a minimum current value (e.g., 0 A) to a maximum current value (e.g., 1 A) within a variation range (e.g., 0 to 1 A) of the current value. In addition, the control unit 60 sets the current supplied to the second linear solenoid valve 29 to the minimum current value when the current supplied to the first linear solenoid valve 25 assumes the maximum current value, and sets the current supplied to the first linear solenoid valve 25 to an intermediate current value dm smaller than the maximum current value and larger than the minimum current value when the current supplied to the second linear solenoid valve 29 assumes the maximum current value. The control unit 60 sets the current supplied to the first linear solenoid valve 25 to the minimum current value when the current supplied to the second linear solenoid valve 29 assumes the intermediate current value dm. The intermediate current value dm is a current value larger than the predetermined current value.

In this embodiment of the invention, the first linear solenoid valve 25 and the second linear solenoid valve 29 are each designed as a normally open-type solenoid valve in which the flow rate and oil pressure of the oil output from a corresponding one of the output ports 25c and 29c are maximized when the minimum current value within the variation range of the current value is obtained. Therefore, when the current supplied to each of the first linear solenoid valve 25 and the second linear solenoid valve 29 is changed from the minimum current value to the maximum current value within the variation range of the current value, the opening degree of a corresponding one of the output ports 25c and 29c changes from a maximum opening degree to a minimum opening degree. Thus, the output pressure from a corresponding one of the output ports 25c and 29c changes from a maximum value to a minimum value.

As shown in FIG. 4, the engine 11 is fitted with a coolant temperature sensor 40 for detecting a temperature Tw of coolant in a water jacket, an accelerator opening degree sensor 41 for detecting an accelerator opening degree Acc corresponding to a depression position of an accelerator pedal (not shown), and a throttle opening degree sensor 42 for detecting an opening degree θth of a throttle valve. The output shaft 11a of the engine 11 or the input side of the torque converter 14 is provided with an engine rotational speed sensor 43 for detecting an output rotational speed of the engine 11 that corresponds to a rotational speed of the pump impeller 14a, namely, an engine rotational speed NE, and the output side of the torque converter 14 is provided with a turbine rotational speed sensor 44 for detecting a rotational speed Nt of the turbine runner 14b. The transmission 12 is provided with a CVT oil temperature sensor 45 for detecting a temperature Tcvt of the working fluid inside the transmission 12. An input shaft rotational speed Nin of the continuously variable shift mechanism 16 is detected by an input shaft rotational speed sensor 46, and depression Bon of a foot brake switch (not shown) is detected by a foot brake switch 47. Furthermore, the operation position Psh of the shift lever 48 is detected by a shift lever position sensor 49, and the vehicle speed V is detected by a vehicle speed sensor 50. Pieces of information detected by a group of these sensors 40 to 50 are acquired by the control unit 60 as shown in FIG. 4.

Next, an operation will be described.

In the oil pressure control device according to this embodiment of the invention, which is configured as described above, the output pressures P1s and P2s of both the first linear solenoid valve 25 and the second linear solenoid valve 29 in the oil pressure control portion 20 are controlled through the control of the currents supplied to the first linear solenoid valve 25 and the second linear solenoid valve 29 (hereinafter referred to simply as the linear solenoid valves 25 and 29 as well), in accordance with the operation position Psh of the shift lever, the vehicle speed V, the throttle opening degree θth, and the like. In consequence, the optimal line oil pressure PL corresponding to the torque generated by the engine 11 or the like and the control pressure (variable sheave pressure) most suited for shifts in the continuously variable shift mechanism 16 are ensured, and preferable continuous shifts are made.

Figure 6:
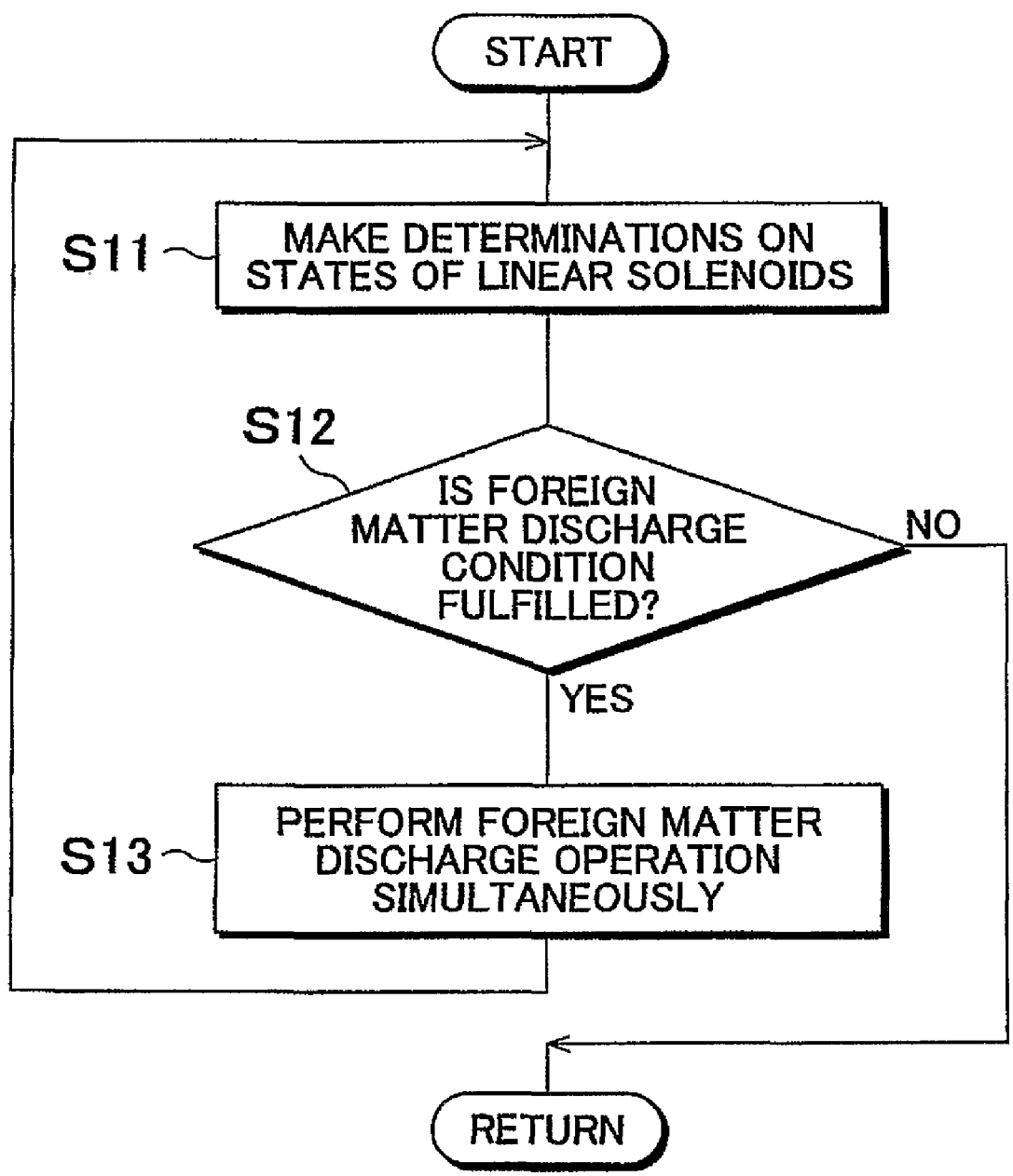
FIG. 6 is a flowchart of the foreign matter discharge treatment carried out simultaneously for the plurality of the linear solenoid valves in the first embodiment of the invention.

The control unit 60 including the transmission control computer 62 repeatedly carries out, for example, a foreign matter discharge treatment shown in FIG. 6 at intervals of a predetermined time.

In this foreign matter discharge treatment, the current values of currents flowing through the linear solenoid valves 25 and 29 are first checked, and determinations on states of the linear solenoid valves 25 and 29 are made on the basis of the pieces of information from the various sensors (step S11).

It is then determined whether or not a predetermined foreign matter discharge condition set in advance is fulfilled (step S12). When this condition is not fulfilled, the present treatment is terminated. The predetermined foreign matter discharge condition in this case is fulfilled, for example, when it is determined that the linear solenoid valves 25 and 29 are estimated to suffer operational malfunction, seizure, or the like from information obtained by monitoring the currents supplied to the linear solenoid valves 25 and 29 and the state of response in the oil pressure control circuit to driving states of the valves within a certain period prior to the start of neutral control.

When the predetermined foreign matter discharge condition set in advance is fulfilled, the current values of the currents flowing through the linear solenoid valves 25 and 29 are then controlled respectively on a predetermined variation condition shown in FIG. 5 in the foreign matter discharge period. The current values of the supplied currents are thereby varied in an increasing direction or a decreasing direction (step S13). Accordingly, the spools 25s and the like of the respective linear solenoid valves 25 and 29 are axially greatly displaced in a reciprocating manner. Thus, even when foreign matters such as metal powders and the like are stuck between the valve housings 25h and 29h and the spools 25s and the like of the linear solenoid valves 25 and 29, it is possible to discharge those foreign matters.

In this embodiment of the invention, the timings for varying the values of the currents supplied to the first linear solenoid valve 25 and the second linear solenoid valve 29 are different from each other in the foreign matter discharge period. Therefore, the original pressure of the second control valve 26 as the output pressure of the first control valve 23, namely, the line oil pressure PL, which is based on the pilot pressure P1s from the first linear solenoid valve 25, decreases when the output pressure from the second control valve 26, which is based on the pilot pressure P2s from the second linear solenoid valve 29, increases.

In addition, the original pressure PL of the second control valve 26 (line oil pressure) as the output pressure of the first control valve 23, which is based on the pilot pressure P1s from the first linear solenoid valve 25, increases when the output pressure Ps of the second control valve 26 at the time of pressure regulation, which is based on the pilot pressure P2s from the second linear solenoid valve 29, decreases.

Accordingly, even when the first linear solenoid valve 25 and the second linear solenoid valve 29 are simultaneously subjected to the foreign matter discharge treatment, the occurrence of a situation in which the actuator 32c and the like as control targets are adversely influenced due to a high value of the output pressure Ps of the second control valve 26 is avoided. Therefore, the foreign matter discharge treatment for the linear solenoid valves 25 and 29 can be carried out simultaneously and quickly without greatly influencing the controlled oil pressure of the oil pressure control device, and a swift transition to subsequent oil pressure control can be made. The discharge of foreign matters from the first control valve 23 and the discharge of foreign matters from the second control valve 26 are also urged simultaneously due to the pilot pressures from the linear solenoid valves 25 and 29.

In the aforementioned foreign matter discharge treatment, as shown in FIG. 5, each of the currents supplied to the linear solenoid valves 25 and 29 alternately changes to the maximum current value and the minimum current value, and temporarily assumes the intermediate current value dm in starting to change from the maximum current value (e.g., 100% or 1 A) to the minimum current value (e.g., 0% or 0 A). That is, the current value of the supplied current is held at the intermediate current value dm earlier than a subsequent timing for changing over the supplied current from the maximum current value to the minimum current value. Accordingly, when the opening degree of the linear solenoid valve 25 or 29 has changed from the maximum opening degree to the minimum opening degree due to the rising of the supplied current, the output pressure changing with a delay can be restrained from undershooting. As a result, a swifter transition to normal control following the foreign matter discharge treatment can be made.

The foreign matter discharge treatment can be carried out simultaneously for the linear solenoid valves 25 and 29 without greatly influencing the controlled oil pressure of the oil pressure control device. Thus, the spools 25s and the like of the linear solenoid valves 25 and 29 are prevented from having foreign matters stuck therein, and from deteriorating in sliding performance or seizing due to sludge produced around the land portions 25sa, 25sb, 25sc, and the like of the spools 25s and the like.

The output port 26c of the second control valve 26 is connected to the oil pressure introduction port 32c in of the actuator 32c constituting part of the vehicular continuously variable transmission. Therefore, the foreign matter discharge treatment can be carried out quickly without adversely influencing the actuator 32c.

After the foreign matter discharge treatment has been carried out simultaneously for the linear solenoid valves 25 and 29 for the predetermined foreign matter discharge period, currents flowing through the linear solenoid valves 25 and 29 are checked again, determinations on states thereof are made on the basis of changes in the currents respectively, and it is then determined whether or not the foreign matter discharge condition is fulfilled. When the foreign matter discharge condition is not fulfilled, the present treatment is terminated.

Second Embodiment

Figure 7:
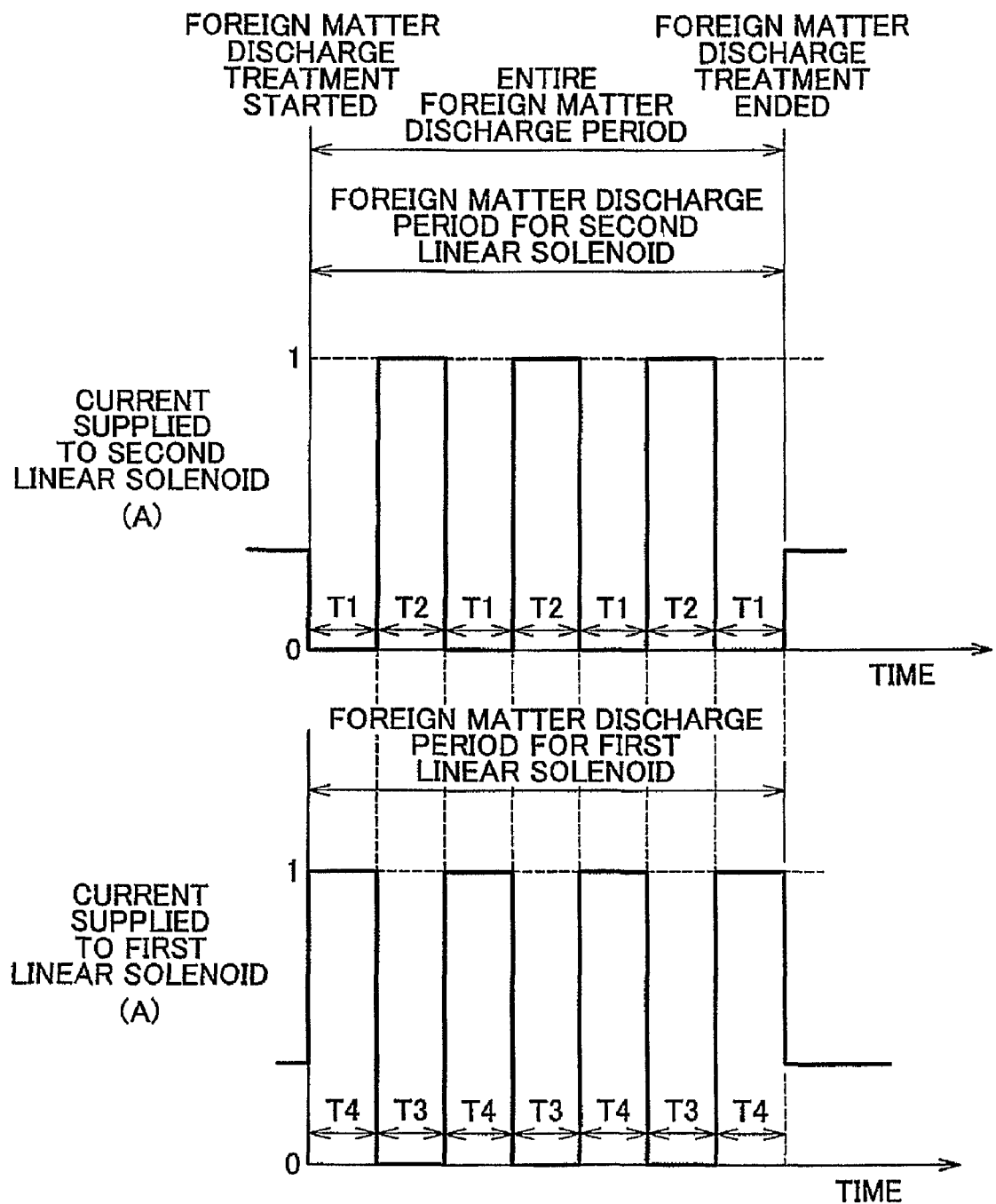
FIG. 7 is an illustrative view of changes in supplied currents in carrying out a foreign matter discharge treatment simultaneously, showing a second embodiment of an oil pressure control device according to the invention.

FIG. 7 is a view showing another embodiment of an oil pressure control device according to the invention. This embodiment of the invention is different from the first embodiment of the invention in means for performing foreign matter discharge control upon fulfillment of the foreign matter discharge condition and the contents of the foreign matter discharge treatment, but identical to the foregoing embodiment of the invention in other configurational details and the foreign matter discharge condition itself. In this case, therefore, the following description will focus especially on what is different from the foregoing embodiment of the invention, using the symbols shown in FIGS. 1 to 6 for the same component elements as in the foregoing embodiment of the invention.

As shown in FIG. 7, in this embodiment of the invention, the current values of the currents supplied to the two linear solenoid valves 25 and 29 in the period of the simultaneous foreign matter discharge treatment assume a completely rectangular current waveform, and each period corresponding to the maximum current value and each period corresponding to the minimum current value are reversed with respect to each other.

More specifically, the first period T1 in which the current smaller than the predetermined current value is supplied to one of the linear solenoid valves 25 and 29, for example, the second linear solenoid valve 29 and the second period T2 in which the current equal to or larger than the predetermined current value is supplied to the second linear solenoid valve 29 are alternately arranged on a time axis. The supply of the current equal to or larger than the predetermined current value to the other of the linear solenoid valves 25 and 29, for example, the first linear solenoid valve 25 is started at the beginning of the first period T1, and the supply of the current smaller than the predetermined current value to the first linear solenoid valve 25 is started at the beginning of the second period T2. Thus, the current values of both the linear solenoid valves 25 and 29 are reversed in variation phase to each other so as not to both assume the minimum current value or the maximum current value.

As is the case with the first embodiment of the invention, the third period T3 in which the current smaller than the predetermined current value is supplied to the first linear solenoid valve 25 is as long as the second period T2, and the fourth period T4 in which the current equal to or larger than the predetermined current value is supplied to the first linear solenoid valve 25 is as long as the first period T1. Furthermore, in this embodiment of the invention, the first period T1 and the second period T2 are set equal to each other, and therefore, the first period T1, the second period T2, the third period T3, and the fourth period T4 are all set equal to one another. However, the first period T1 and the second period T2 may be unequal to each other. In the case where the first period T1 and the second period T2 are unequal to each other, the third period T3 and the fourth period T4 are set unequal to each other.

In this embodiment of the invention as well, when the predetermined foreign matter discharge condition is fulfilled, the current values of the currents flowing through the linear solenoid valves 25 and 29 are controlled on the predetermined variation condition shown in FIG. 7 in the foreign matter discharge period. The current values of the supplied currents vary in an increasing direction or a decreasing direction, and hence, the spools 25s and the like of the respective linear solenoid valves 25 and 29 are axially greatly displaced in a reciprocating manner. Thus, even when foreign matters such as metal powders and the like are stuck between the valve housings 25h and 29h and the spools 25s and the like of the linear solenoid valves 25 and 29, it is possible to discharge those foreign matters.

The timings at which the values of the currents supplied to the first linear solenoid valve 25 and the second linear solenoid valve 29 increase are different from the timings at which the values of the currents supplied to the first linear solenoid valve 25 and the second linear solenoid valve 29 by a phase of 180°. Therefore, the original pressure of the second control valve 26 as the output pressure of the first control valve 23, namely, the line oil pressure PL, which is based on the pilot pressure P1s from the first linear solenoid valve 25, decreases when the output pressure Ps of the second control valve 26, which is based on the pilot pressure P2s from the second linear solenoid valve 29, increases.

In addition, the original pressure PL of the second control valve 26 (line oil pressure) as the output pressure of the first control valve 23, which is based on the pilot pressure P1s from the first linear solenoid valve 25, increases when the output pressure Ps of the second control valve 26 at the time of pressure regulation, which is based on the pilot pressure P2s from the second linear solenoid valve 29, decreases. Accordingly, in this embodiment of the invention as well, an effect similar to that of the foregoing first embodiment of the invention is achieved.

In the foregoing first embodiment of the invention, the current values of the currents supplied to the linear solenoid valves in the foreign matter discharge period are decreased in stages. These current values may be decreased in multiple stages instead of two stages, or in a stageless manner (gradually). In the case where the current values are decreased in two stages, the intermediate current value dm may be reduced from the value shown in FIG. 5 to, for example, about half of the maximum value. Furthermore, in the foreign matter discharge treatment shown in FIG. 5, the patterns according to which the currents are supplied to the first linear solenoid valve and the second linear solenoid valve may be reversed with respect to each other. In other words, the pattern according to which the current is supplied to the first linear solenoid valve may be applied to the second linear solenoid valve, and the pattern according to which the current is supplied to the second linear solenoid valve may be applied to the first linear solenoid valve. The solenoid valves employed in the invention are not limited to the pressure regulating valves as in the cases of the foregoing examples, but may be designed to electromagnetically drive and thereby displace the valve bodies to perform the control of flow rate. The solenoid valves are not necessarily limited to translation-type solenoid valves.

In the foregoing embodiments of the invention, the examples in which the two linear solenoid valves 25 and 29 are used have been described, but the invention is not limited to those examples. Two or more linear solenoid valves may be used. In such a case, a plurality of linear solenoid valves identical to the first linear solenoid valve of the invention and a plurality of linear solenoid valves identical to the second linear solenoid valve of the invention may be provided.

As described above, according to the invention, the oil pressure control device for carrying out the foreign matter discharge treatment quickly while making it possible to carry out the foreign matter discharge treatment simultaneously for the plurality of the solenoid valves without greatly influencing the controlled oil pressure of the oil pressure control device in the oil pressure control circuit that is equipped with the plurality of the solenoid valves and the means for carrying out the foreign matter discharge treatment for the solenoid valves to perform oil pressure control accurately can be provided. This oil pressure control device is especially useful as any of all types of oil pressure control devices for carrying out a foreign matter discharge treatment for a plurality of solenoid valves.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. An oil pressure control device comprising:
a first solenoid valve and a second solenoid valve, having pressure regulating valves for regulating pressures of a working fluid supplied thereto in accordance with displacement strokes of valve bodies and outputting the regulated pressures respectively and electromagnetic drive portions for displacing the valve bodies of the pressure regulating valves with forces corresponding to supplied currents respectively;
a first control valve that is actuated using a working fluid pressure output from the first solenoid valve as a pilot pressure, and that regulates a pressure of the supplied working fluid in accordance with a supply pressure of the working fluid and the pilot pressure from the first solenoid valve;
a second control valve that has input thereto the working fluid pressure regulated by the first control valve as an original pressure and is actuated using a working fluid pressure output from the second solenoid valve as a pilot pressure, and that regulates the pressure of the working fluid at the original pressure in accordance with the pilot pressure from the second solenoid valve and outputting the regulated pressure; and
a foreign matter discharge unit that carries out a foreign matter discharge treatment for the first solenoid valve and the second solenoid valve by varying current values of currents supplied to the first solenoid valve and the second solenoid valve respectively in an increasing direction or a decreasing direction and displacing the valve bodies of the respective solenoid valves in a reciprocating manner, wherein:
the foreign matter discharge unit carries out the foreign matter discharge treatment for a treatment period composed of a first period in which a current smaller than a predetermined current value is supplied to one of the first solenoid valve and the second solenoid valve and a second period in which a current equal to or larger than the predetermined current value is supplied to the one of the solenoid valves; and the foreign matter discharge unit starts supplying a current equal to or larger than the predetermined current value to the other of the first solenoid valve and the second solenoid valve at a beginning of or during the first period, and starts supplying a current smaller than the predetermined current value to the other of the solenoid valves at a beginning of or during the second period.

2. The oil pressure control device according to claim 1, wherein:

the first solenoid valve and the second solenoid valve are each designed as a normally open-type solenoid valve for maximizing an output pressure of the working fluid when a minimum current value within a variation range of the current value is obtained; and the foreign matter discharge unit sets, when the current supplied to one of the first solenoid valve and the second solenoid valve assumes a maximum current value, the current supplied to the other of the first solenoid valve and the second solenoid valve to the minimum current value, sets the current supplied to the one of the solenoid valves to an intermediate current value smaller than the maximum current value and larger than the minimum current value when the current supplied to the other of the solenoid valves assumes the maximum current value, and sets the current supplied to the one of the solenoid valves to the minimum current value when the current supplied to the other of the solenoid valves assumes the intermediate current value.

3. The oil pressure control device according to claim 2, wherein the foreign matter discharge unit changes the current supplied to each of the first solenoid valve and the second solenoid valve from the minimum current value to the maximum current value within the variation range of the current value in starting to supply the current equal to or larger than the predetermined current value to the one of the solenoid valves.

4. The oil pressure control device according to claim 1, wherein the first solenoid valve and the second solenoid valve are each designed as a linear solenoid valve for translating a corresponding one of the valve bodies, which assumes a spool-like shape, in accordance with a thrust force from a corresponding one of the electromagnetic drive portions.

5. The oil pressure control device according to claim 1, wherein the second control valve has an output port for the working fluid at the regulated pressure, and the output port is connected to an oil pressure introduction port of an actuator constituting part of a vehicular continuously variable transmission.

6. The oil pressure control device according to claim 1, wherein the first control valve and the second control valve have an output pressure based on the pilot pressure from the first solenoid valve and an output pressure based on the pilot pressure from the second solenoid valve respectively, and the output pressure of the first control valve decreases when the output pressure of the second control valve increases, and increases when the output pressure of the second control valve decreases, in the treatment period in which the foreign matter discharge treatment is carried out.

7. The oil pressure control device according to claim 1, wherein:

the first solenoid valve and the second solenoid valve are equipped with feedback pressure chambers for introducing output pressures from output ports thereof respectively; and each of the feedback pressure chambers has two pressure receiving faces opposed to each other in an axial direction of a corresponding one of the solenoid valves, and the one of the pressure receiving faces which receives a pressure identical in direction to an urging force from a corresponding one of the electromagnetic drive portions has a larger area than the one of the pressure receiving faces which receives a pressure opposite in direction to the urging force.

8. The oil pressure control device according to claim 1, wherein the predetermined current value is a value corresponding to a control target oil pressure immediately after or before the foreign matter discharge treatment.

9. The oil pressure control device according to claim 1, wherein the predetermined current value is a value corresponding to a control target oil pressure immediately after or before the foreign matter discharge treatment.

10. A control method in an oil pressure control device equipped with a first solenoid valve, a second solenoid valve, a first control valve and a second control valve, the method comprising:

making determinations on states of the first solenoid valve and the second solenoid valve;

determining whether or not a predetermined foreign matter discharge condition is fulfilled; and starting to supply, at a beginning of or during a first period in which a current smaller than a predetermined current value is supplied to one of the first solenoid valve and the second solenoid valve, a current equal to or larger than the predetermined current value to the other of the first solenoid valve and the second solenoid valve, and starting to supply a current smaller than the predetermined current value to the other of the solenoid valves at a beginning of or during a second period in which a current equal to or larger than the predetermined current value is supplied to the one of the solenoid valves, when the foreign matter discharge condition is fulfilled, wherein the first control valve is actuated using a working fluid pressure output from the first solenoid valve as a pilot pressure, and regulates a pressure of the supplied working fluid in accordance with a supply pressure of the working fluid and the pilot pressure from the first solenoid valve, and the second control valve has input thereto the working fluid pressure regulated by the first control valve as an original pressure and is actuated using a working fluid pressure output from the second solenoid valve as a pilot pressure, and regulates the pressure of the working fluid at the original pressure in accordance with the pilot pressure from the second solenoid valve and outputs the regulated pressure.

11. The control method according to claim 10, wherein the predetermined foreign matter discharge condition is a condition that operational malfunctions of the first solenoid valve and the second solenoid valve are estimated from supplied currents and a state of response in an oil pressure circuit to the states of the solenoid valves in a certain period prior to start of neutral control.

* * * * *

UNITED STATES PATENT AND TRADEMARK OFFICE
CERTIFICATE OF CORRECTION

PATENT NO. : 8,393,345 B2  
APPLICATION NO. : 12/529853  
DATED : March 12, 2013  
INVENTOR(S) : Yusuke Ogata and Yoshinobu Soga Page 1 of 1

It is certified that error appears in the above-identified patent and that said Letters Patent is hereby corrected as shown below:

Title Page, Item (73) should read:

(73) Assignee: Toyota Jidosha Kabushiki Kaisha  
Aichi-ken (JP)

Signed and Sealed this  
Second Day of July, 2013

Teresa Stanek Rea  
*Acting Director of the United States Patent and Trademark Office*